F. MICHALEK.
NOODLE MACHINE.
APPLICATION FILED JUNE 26, 1914. RENEWED FEB. 12, 1920.

1,352,826.

Patented Sept. 14, 1920.
2 SHEETS—SHEET 1.

Witnesses:
Arthur W. Carlson
W. C. Smith

Inventor:
Frank Michalek
by Jno. G. Elliott
Atty.

F. MICHALEK.
NOODLE MACHINE.
APPLICATION FILED JUNE 26, 1914. RENEWED FEB. 12, 1920.
1,352,826.
Patented Sept. 14, 1920.
2 SHEETS—SHEET 2.
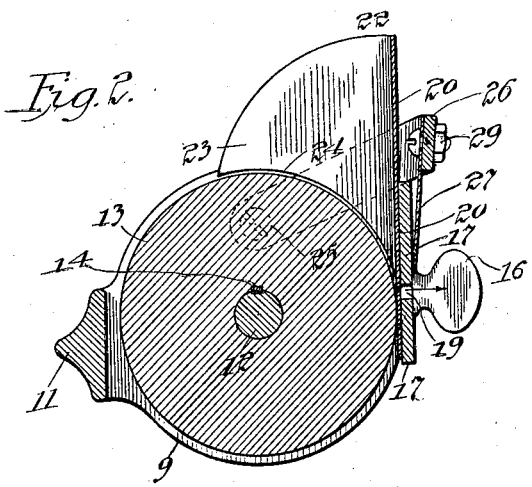
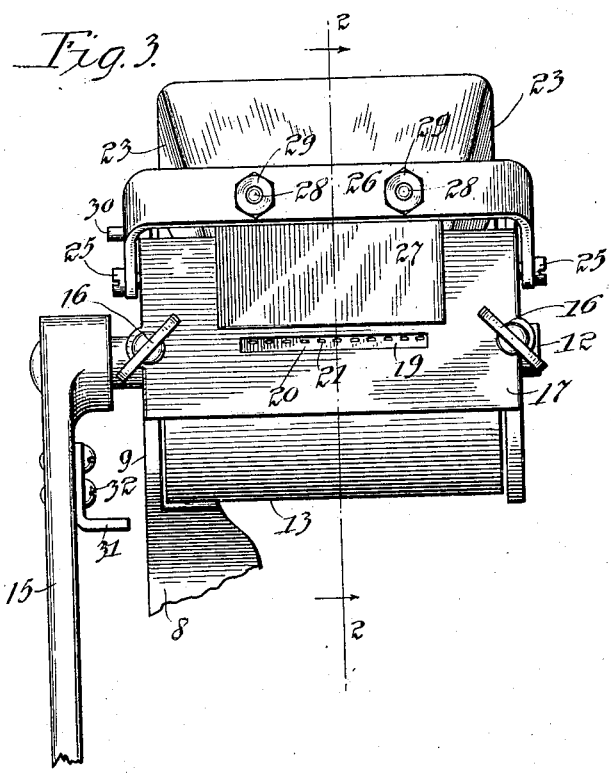

UNITED STATES PATENT OFFICE.

FRANK MICHALEK, OF CHICAGO, ILLINOIS.

NOODLE-MACHINE.

1,352,826.  Specification of Letters Patent.  Patented Sept. 14, 1920.

Application filed June 26, 1914, Serial No. 847,389. Renewed February 12, 1920. Serial No. 358,126.

*To all whom it may concern:*

Be it known that I, FRANK MICHALEK, a citizen of the United States, and resident of Chicago, in the county of Cook and State of Illinois, have invented certain new and useful Improvements in Noodle-Machines, of which the following is a full, clear, and exact specification.

This invention relates to improvements in noodle machines, heretofore requiring opposing rolls for cutting the dough into strips forming as many noodles, each of which is provided with a plurality of intermeshing circumferential cutters requiring for their operation that the dough be previously reduced to sheet form either by hand rolling, or by reducing rolls mounted upon a machine, which machines are therefore objectionable not only in cost of construction and operation, but in the time required for the production of noodles therefrom.

My invention broadly stated is a noodle machine by which it is possible and practical to simultaneously produce a series of noodles from a mass of dough by a drawing process.

A further object of my invention is a noodle machine of the simplest construction, in which it is possible and practical to sever in uniform lengths a series of simultaneously produced noodles forced out of a mass of dough.

Another and important object of my invention is a noodle machine, the construction and operation of which is such that a series of noodles may be forced out of a mass of dough in such a manner that the noodles are sufficiently hard and dry on their discharge from the machine as to render them capable of immediate use.

Another object of my invention is a noodle machine, the construction and operation of which is such that a single operator may operate it by hand, and simultaneously therewith continuously supply it with dough, and whereby the noodles may be produced at a minimum cost in time and labor, and by means of a very inexpensive machine.

More specifically stated the object of my invention is a noodle machine in which noodles may be produced of any cross-sectional form and size, from a mass of dough by means of a fixed die through which the dough is forced by a single roll, and continuously formed noodles are severed into uniform lengths by a cutter connected with and actuated by the crank arm for operating the roll.

With these ends in view, my invention finds embodiment in certain features of novelty in the construction, combination and arrangement of parts by which the said objects and certain other objects are attained, all as hereinafter fully described with reference to the accompanying drawings, and more particularly pointed out in the claims.

In said drawings:

Fig. 2 is a transverse section on the line 2—2 of Fig. 3, looking in the direction of the arrows, and—

Fig. 3 is a front elevation of the machine.

Similar characters of reference indicate the same parts in the several figures of the drawings.

Figure 1:
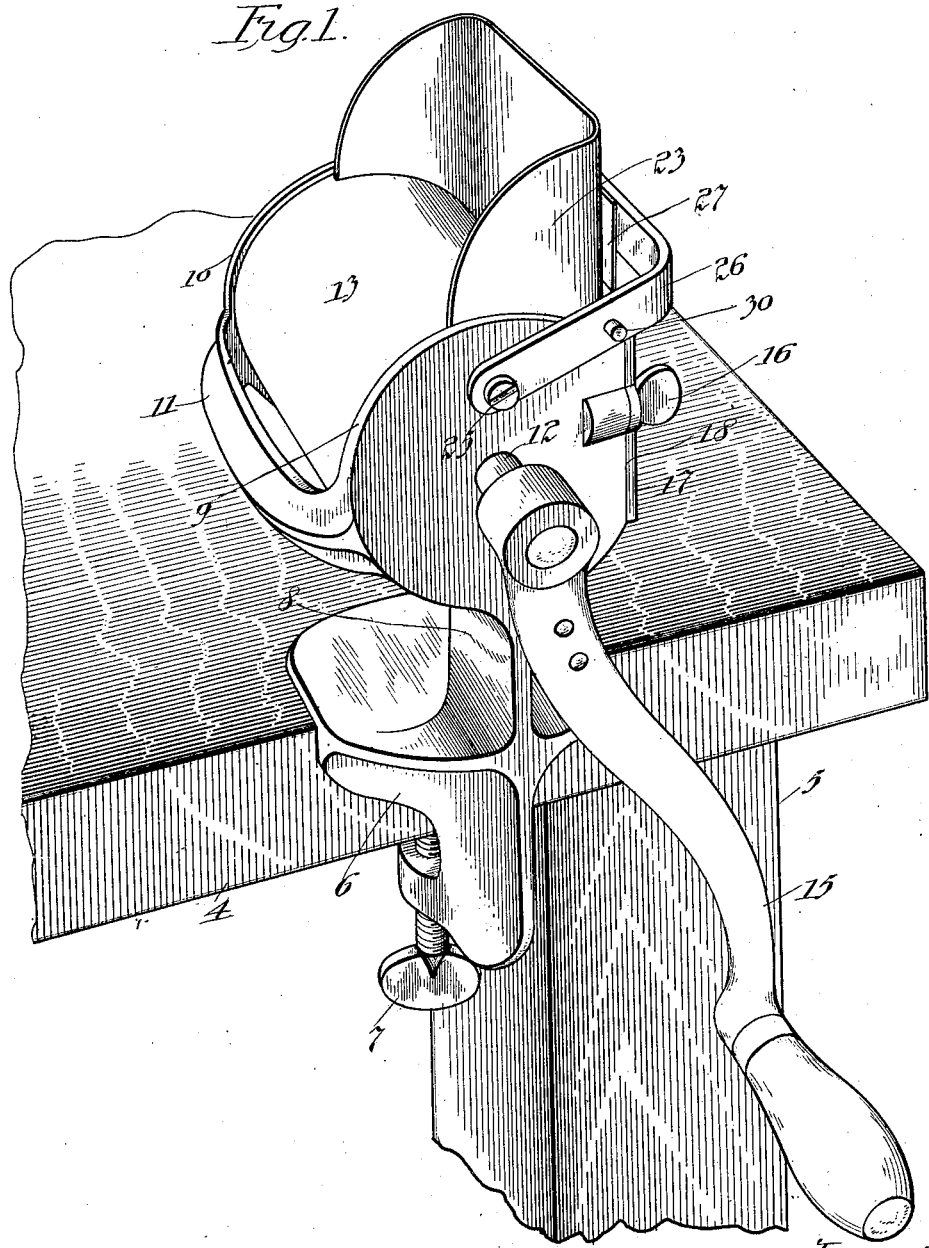
Figure 1 illustrates a view in perspective of a noodle machine in which my invention finds embodiment.

4 indicates a table top or board, and which if a table may be provided with the necessary number of legs 5, to which table the noodle machine of my invention may be secured by means of a clamp, consisting of a casting 6, and thumb screw 7 of any desired construction, a post 8 rising from the clamp, serving as a support for the frame of the machine, consisting of circular like plates 9 and 10, the former of which, 9, is cast with, or otherwise directly secured to the post 8, the two plates 9 and 10 being connected by means of a side bar 11.

Journaled at its opposite ends in the end plates 9 and 10 is a shaft 12, on which is secured a roll 13 by means, see Fig. 2, of a key 14, which roll is confined and free to revolve between the end plates 9 and 10 and actuated by means of a hand operated crank arm 15, but may be by power mechanism, although such mechanism may need only be used for very large machines in the extensive manufacture of noodles for wholesale trade.

Removably secured to the front edges of the end plates 9 and 10 by means of thumb screws 16—16 is a die plate 17, and for which purpose the adjacent edges of the plates 9 and 10 may be flattened as indicated at 18, through which die plate is an elongated slot 19 in a plane slightly above the axis of the roll 13.

Projecting between the slot 19 of the plate 17 and periphery of the roll is a vertically arranged plate 20 through which is a series of perforations 21, the form and diameters of which determine the cross-sectional form and size of the noodles produced by the machine, as for example, the noodles may be of the size and form of spaghetti or vermicelli, or in the flat ribbon-like form commonly made by housewives in the absence of a machine, and usually following the hand rolling of dough into a thin sheet, followed by cutting it in strips with a knife blade.

The plate 20 forms the front wall of a dough container or hopper 22, the side walls 23—23 of which project in a rearward direction over the roll at each end thereof, and have their bottom edges 24 slightly separated from and curved upon an arc of a circle conforming as nearly as may be to that of the roll.

The front wall 20 of the hopper may extend the full length of the roll, but in practice it is preferred to have its side edges converge downwardly and have the side walls of the hopper converge outwardly therefrom, whereby on rotating the roll the dough will be forced from both ends toward its center of length, and the dough be accordingly compressed before it is forced by the roll through the perforations 21.

Pivoted upon screws 25—25 secured in the opposite rolls of the hopper is a yoke 26 supporting a cutter blade 27 secured to the yoke 26 by screws 28—28 and nuts 29—29, which blade is of spring metal, and is preferably slightly curved outwardly whereby the necessity of a restricting spring is avoided as will presently appear.

It will now be noted that the yoke is pivoted in a plane above the shaft 12 and slightly above a point midway between the axis of the shaft and the periphery of the roll.

In other words the yoke is pivoted at a point producing an inward movement of the movement of the cutting blade flexing the blade its full length against the plate 17 as it descends across the slot 19 to sever the noodles discharging through the perforations 21, and as a result of which when the yoke is free from its depressing device, the spring in the cutting blade will force the yoke upwardly, and with it the blade to their normally elevated position.

For depressing the cutting blade sufficiently to sever the discharging noodles, the yoke 26 is provided with a laterally projecting pin or lug 30, adapted to be engaged by a stud 31 secured to the arm of the crank by means of one or more screws 32 in the path of the stop lug 30, whereby at each complete revolution of the crank 15 when revolved in the direction of the arrow in Fig. 1, the yoke is depressed and carries with it the blade 27 downwardly with it until the noodles are severed, immediately following which the stud 31 becomes disengaged from the lug 30, and thereupon the spring action before described of the cutting blade returns the yoke together with the blade to their normally elevated position.

In operation dough is piled on the table, the bulk of which depends upon the amount of noodles to be made, whereupon the operator with one hand keeps the hopper supplied with dough from time to time, while continuously operating the crank, with the result that when in condition for producing noodles therefrom the dough adheres to the roll with sufficient tenacity for the roll to force the dough downwardly through the hopper and out through the perforated die in the form and forms of noodles before described.

While the noodles are issuing from the machine they are severed by the cutting blade at every turn of the crank handle as before described, and in this connection it should be observed that the blade is so quickly actuated by the crank arm and retracted by its spring action, that there is substantially no obstruction to the continuous discharge of the noodles from the machine.

The noodle machine of my invention may be constructed at a nominal cost as compared with other machines heretofore used for the same purpose, for the reason that there need be but one casting for supporting the roll and other parts of the machine, that there is but one roll, one die plate, and that the hopper may be cut and formed from sheet tin, and the perforations determining the form and size may be and preferably are punched out of the tin forming the hopper.

It would however, be no departure from my invention to form in the plate 17 the perforations determining the form and size of the noodles to be produced by the machine. It is probably cheaper to form them in the front wall of the hopper, as the cost of construction is so small that the employment of several hoppers provided with perforations for producing as many differing forms and sizes of noodles when using the same roll would not involve an objectionable additional expense either in manufacturing or selling a single machine accompanied by a plurality of hoppers.

Having described my invention, what I claim and desire to secure by Letters Patent is:

1. A noodle machine comprising in combination a dough hopper, a plain cylindric roll, a fixed die plate having a single elongated slot above the axis of said roll, a plurality of perforations in said hopper in register with said slot, means for rotating said roll to force the dough longitudinally of the hopper to thin and compact the mass and successively through said perforations and slot, and an intermittently actuated cutting blade operated by said means.

2. A noodle machine comprising in combination a hopper having a wall formed to present a perforated die for containing a mass of dough, a plain surfaced roll having an axis not higher than the perforations in said die, means for operating said roll to force the dough from the hopper through the die portion, a resilient reciprocating severing blade, a suitable support suspending said blade, and means whereby said blade is retracted from its cutting position including the flexing and releasing of said blade.

3. A noodle machine comprising in combination a hopper for containing dough in mass, and having a wall formed to present a fixed perforated die, a single cylindric roller for forcing the dough from the hopper directly through said die portion, a crank arm for actuating said roller, a cutting blade, a vibrating means suspending said blade, means whereby the cutting blade is intermittently depressed through the operation of the crank arm, and means for elevating the cutting blade above its depressed cutting position including the flexing and quickly releasing of said blade.

4. A noodle machine comprising in combination a hopper for containing a mass of dough and having a wall formed to present a fixed perforated die, a roll forming the bottom of the hopper for forcing the dough therefrom through the die portion, a pivoted yoke, a resilient concavo convex cutting blade secured to the yoke, a crank arm, a projection upon said crank arm adapted to intermittently engage the yoke and depress the cutter and thereby flex the cutting blade during its cutting stroke, whereby the tension of the cutting blade returns and maintains it out of its cutting position when and after the disengagement of the yoke from the crank arm.

5. A noodle machine comprising in combination a removable hopper for containing a mass of dough, said hopper having a perforated front wall having downwardly converging side edges and a pair of side walls, a plain cylindric roll, a die plate having a single elongated slot above the axis of said roll and in register with said perforations of said front wall, means for rotating said roll including a crank arm, a pivoted yoke, a resilient blade secured to said yoke, a projection upon said crank arm adapted to intermittently engage the yoke and draw same down to flex said blade and whereby the sudden release of said flexed blade will return the yoke to raised position.

6. A noodle machine comprising in combination a single roll, and a dough hopper having a stationary wall and a plurality of separated perforations opening approximately from the point of minimum space between the roll and wall.

7. A noodle machine comprising in combination a hopper having a stationary integral die provided with a plurality of perforations, a roll adjacent said hopper and means operating said roll to gradually force the mass of dough directly from the hopper through the perforated die and substantially perpendicularly to the flow of said dough from said mass, said perforations opening approximately from the point of minimum space between the wall and die.

8. A noodle machine comprising in combination a hopper, a fixed die integrally with said hopper and provided with a plurality of perforations, a roll adjacent said hopper, means operating said roll to gradually force the mass of dough directly from the hopper through the perforated die, and substantially perpendicularly to the flow of dough from said mass, said perforations opening approximately from the point of minimum space between the roll and die.

9. In a noodle machine, a resilient reciprocating severing blade, a pivoted movable support suspending said blade for operation over a fixed surface and means for actuating said support to move the blade over the fixed surface and a portion of said blade relatively to the remainder, to tension the blade.

10. In a noodle machine, a blade for severing the formed noodles, means for forming noodles including a substantially fixed surface, and having a cutting edge and a supported edge to coöperate with said fixed surface, and means for operating the blade to advance the cutting edge and swing the supported edge in an arc in such a manner as to flex the blade, whereby to create a return-movement tension in the blade.

11. In a noodle machine, means for forming noodles including a substantially fixed surface beyond which the noodles are forced, a blade for severing the formed noodles and having a cutting edge for movement over such fixed surface and a supported edge, and means for operating the blade to move the supported edge in a direction from said fixed surface during the operative movement of the cutting edge whereby to flex the blade.

12. A noodle machine, comprising a hopper having a relative fixed wall and a rotating wall, the operative plane of the rotating wall converging to a substantial contact with the fixed wall, said fixed wall being formed with openings at substantially the point of contact between the walls.

13. A noodle machine, comprising a hopper having a wall formed with perforations to provide a die, and an opposed rotating wall having an operative plane converging with said die wall to a substantial contact approximately on the line of said perforations.

In witness whereof I have hereunto set my hand and affixed my seal, this 23rd day of June, A. D. 1914.

FRANK MICHALEK. [L. S.]

Witnesses:
MILDRED ELSNER,
JNO. G. ELLIOTT.